United States Patent
Ohnuki et al.

(10) Patent No.: US 6,385,140 B2
(45) Date of Patent: May 7, 2002

(54) MAGNETO-OPTICAL RECORDING MEDIUM AND REPRODUCING METHOD FOR REPRODUCING MAGNETIC DOMAIN IN ENLARGED FORM ON A REPRODUCING LAYER

(75) Inventors: Satoru Ohnuki, Toride; Norio Ohta, Ibaraki; Katsusuke Shimazaki, Ibaraki; Masafumi Yoshihiro, Ibaraki; Hiroki Takao, Ibaraki; Hitoshi Watanabe, Ibaraki, all of (JP)

(73) Assignee: Hitachi Maxell, Ltd., Ibaraki (JP)

( * ) Notice: Subject to any disclaimer, the term of this patent is extended or adjusted under 35 U.S.C. 154(b) by 0 days.

(21) Appl. No.: 09/799,602

(22) Filed: Mar. 7, 2001

Related U.S. Application Data

(63) Continuation of application No. 09/091,480, filed as application No. PCT/JP96/03716 on Dec. 20, 1996, now Pat. No. 6,226,234.

(30) Foreign Application Priority Data

Dec. 20, 1995 (JP) ............................................... 7-349746

(51) Int. Cl.[7] .............................................. G11B 11/00
(52) U.S. Cl. ............................... 369/13.35; 369/13.26; 369/13.09
(58) Field of Search ....................... 369/13, 14; 365/122; 300/59, 114; 428/694 ML, 694 MM

(56) References Cited

U.S. PATENT DOCUMENTS

| | | | |
|---|---|---|---|
| 5,659,537 A | 8/1997 | Hirokane et al. | |
| 5,982,715 A | * 11/1999 | Mori et al. | ..................... 369/13 |
| 6,178,143 B1 | * 1/2001 | Hirokane et al. | ............. 369/13 |

FOREIGN PATENT DOCUMENTS

| | | |
|---|---|---|
| JP | 1143041 | 6/1989 |
| JP | 4325948 | 11/1992 |
| JP | 5144106 | 6/1993 |
| JP | 6295479 | 10/1994 |
| JP | 7296434 | 11/1995 |
| JP | 8-7350 | 1/1996 |
| JP | 836792 | 2/1996 |
| JP | 8161788 | 6/1996 |
| JP | 8-203141 | 8/1996 |
| JP | 8-339581 | 12/1996 |
| JP | 10-172194 | 6/1998 |
| JP | 10-255344 | 9/1998 |

OTHER PUBLICATIONS

Journal of Magnetics Society of Japan, vol. 17, Supplement No. S1, pp. 201 (1993).

* cited by examiner

*Primary Examiner*—Tan Dinh
(74) *Attorney, Agent, or Firm*—Birch, Stewart, Kolasch & Birch, LLP

(57) ABSTRACT

A magneto-optic recording medium includes a second auxiliary magnetic film, a first auxiliary magnetic film and a magneto-optic recording film on a substrate. The auxiliary magnetic films change from in-plane magnetization to vertical magnetization at critical temperatures $T_{CR1}$ and $T_{CR2}$. Since they have the relation $T_{CR1} > T_{CR2}$, the magnetic domain transferred from the magneto-optic recording film to the first auxiliary magnetic film at the time of reproduction is expanded in diameter and is transferred to the second auxiliary magnetic film when the temperature profiles of the auxiliary magnetic films inside an optical spot are utilized. The magnetic domain of the magneto-optic recording film can be expanded and transferred, too, by means of magnetostatic coupling by using a non-magnetic film in place of the first auxiliary magnetic film. Pulse reproduction light subjected to power modulation in synchronism with a reproduction clock can be used at the time of reproduction. Even when a very small magnetic domain is recorded, the intensity of an amplified reproduction signal can be detected and excellent C/N can be obtained.

3 Claims, 13 Drawing Sheets

POSITION IN REPRODUCING LIGHT SPOT

POSITION IN REPRODUCING LIGHT SPOT

KERR EFFECT TEMPERATURE CHARACTERISTICS

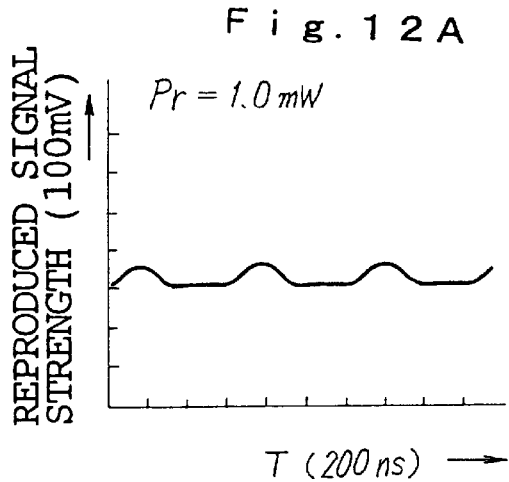
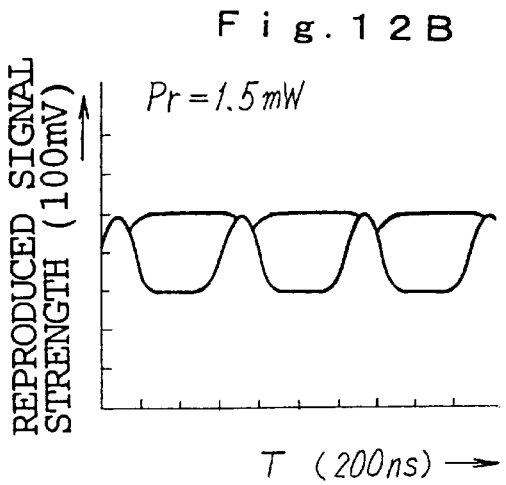
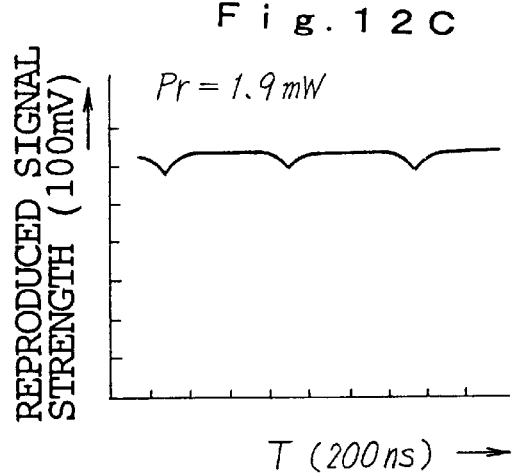
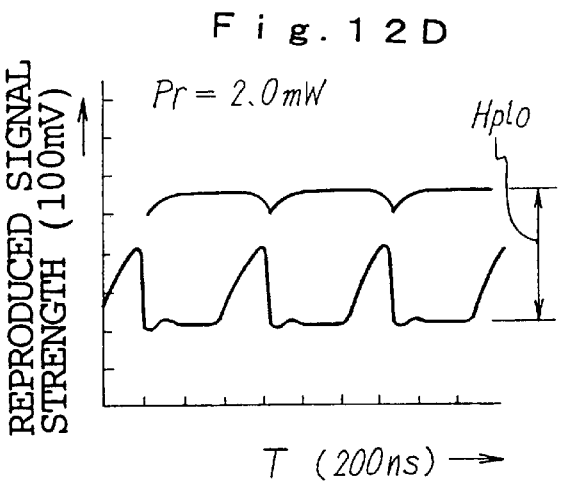
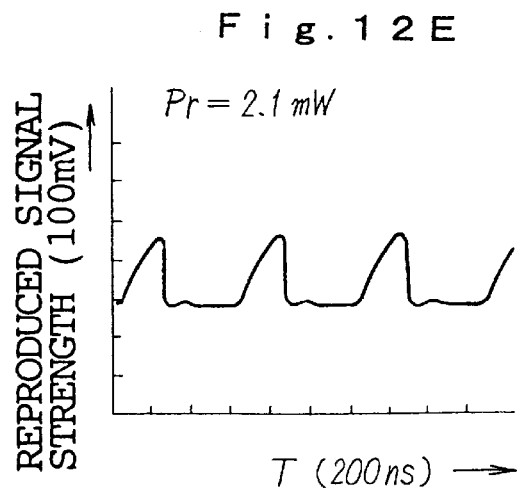

MAGNETO-OPTICAL RECORDING MEDIUM AND REPRODUCING METHOD FOR REPRODUCING MAGNETIC DOMAIN IN ENLARGED FORM ON A REPRODUCING LAYER

BACKGROUND OF THE INVENTION

This application is a continuation of application Ser. No. 09/091,480, filed on Jun. 19, 1998 now U.S. Pat. No. 6,226,234 and for which priority is claimed under 35 U.S.C. § 120. Application Ser. No. 09/091,480 is the national phase of PCT International Application No. PCT/JP96/03716 filed on Dec. 20, 1996 under 35 U.S.C. § 371. The entire contents of each of the above-identified applications are hereby incorporated by reference. This application also claims priority of Application No. 7-349746 filed in Japan on Dec. 20, 1995 under 35 U.S.C. § 119.

FIELD OF THE INVENTION

This invention relates to a magneto-optical recording medium and a reproducing method therefor. More particularly, the invention relates to a magneto-optical recording medium and a reproducing method therefor which can reproduce or read a fine recorded magnetic domain, much smaller than a reproducing light spot, in an enlarged form and which are suitable for high density recording.

BACKGROUND ART

A magneto-optical recording medium is capable of rewriting recorded information, has a large storage capacity, and is highly reliable as a recording medium. Thus, it begins to be put to practical use as a computer memory or the like. With increases in the amount of information and downsizing of equipment, however, a demand is growing for even higher density recording/reproducing technologies. To record information on a magneto-optical recording medium, a magnetic modulation method is used which irradiates the magneto-optical recording medium with constant laser light, and simultaneously applies a magnetic field of a polarity corresponding to a recording signal to a heated area of the medium. This method permits overwrite recording, and achieves high density recording, e.g., recording at the shortest mark length of 0.15 µm. An optical modulation recording system for irradiating the medium with light power-modulated in response to recording signals under a constant magnetic field applied has also found practical use.

To reproduce or read record marks recorded at a high density, an optical reproduction resolution or resolving power determined by the spot size or diameter of a reproducing light beam should be given particular attention. For example, it is impossible to discern and reproduce a fine mark with a magnetic domain length of 0.15 µm by the use of reproducing light with a spot diameter of 1 µm. As one of the approaches for eliminating this restriction on reproduction resolving power by the optical spot diameter of reproducing light, a proposal has been made for magnetic: super-resolution (MSR) as described in the Journal of Magnetics Society of Japan, Vol. 17, Supplement No. S1, pp. 201 (1993). This technique utilizes the phenomenon that when reproducing light is cast on a magneto-optical recording medium, a temperature distribution occurs in a magnetic film within a reproducing light spot. Because of this phenomenon, a magnetic mask is generated in the spot to decrease the effective spot diameter contributing to the reproduction or reading of a signal. The use of this technology can improve reproduction resolving power without reducing the actual reproducing light spot diameter. However, this method makes the effective spot diameter small by the action of the magnetic mask. Thus, the amount of light contributing to a reproduction output decreases, and a reproduction C/N ratio declines accordingly. Consequently, it becomes difficult to obtain a sufficient C/N ratio.

Japanese Patent Application Laid-Open No. 1-143041 discloses a reproducing method for a magneto-optical recording medium, which uses a magneto-optical recording medium having a first magnetic film, a second magnetic film and a third magnetic film connected together magnetically at room temperature, the Curie temperatures of the first, second and third magnetic films being $T_{C1}$, $T_{C2}$ and $T_{C3}$, respectively, with $T_{C2}$>room temperature and $T_{C2}<T_{C1}, T_{C3}$, the coercivity of the first magnetic film, $H_{C1}$, being sufficiently small at a temperature in the vicinity of the Curie temperature $T_{C2}$ of the second magnetic film, and the coercivity of the third magnetic film, $H_{C3}$, being sufficiently large compared with a required magnetic field in a temperature range from room temperature to a required temperature $T_{PB}$ higher than $T_{C2}$, whereby the recorded magnetic domains of the first magnetic film are enlarged to perform reproduction. This method utilizes a temperature rise of the medium upon irradiation with reproducing light to cut off the magnetic connection between the first and third magnetic films, and enlarges the magnetic domains of the first magnetic film by a demagnetizing field acting in the recorded magnetic domains in this condition and an externally applied magnetic field. With this technique, the second magnetic film used has a Curie temperature set at a lower value than the temperature of a readout area working during reproduction. The present invention, on the other hand, does not use a magnetic film with such magnetic characteristics.

It is an object of the present invention to solve the problems with the earlier technologies by a method different from the method described in Japanese Patent Application Laid-Open No. 1-143041, and provide a magneto-optical recording medium which gives reproduced signals at a sufficient C/N ratio even when fine magnetic domains are recorded, as well as a reproducing method for the signals.

SUMMARY OF THE INVENTION

According to a first aspect of the present invention, there is provided a magneto-optical recording medium having a magneto-optical recording film and an auxiliary magnetic film, and being adapted to reproduce a signal by magnetically transferring a recorded magnetic domain of the magneto-optical recording film to the auxiliary magnetic film upon irradiation with reproducing light, characterized in that:

the auxiliary magnetic film is a magnetic film of at least one layer which transforms from a plane-magnetized film into a perpendicular-magnetized film when exceeding its critical temperature, while the magneto-optical recording film is a perpendicular-magnetized film at a temperature not lower than room temperature;

whereby a larger magnetic domain than the recorded magnetic domain of the magneto-optical recording film can be transferred to the auxiliary magnetic film at the time of reproduction by virtue of the magnetic characteristics of the auxiliary magnetic film.

The magneto-optical recording medium of the present invention can be further classified into the following two types of magneto-optical recording media:

The first type of magneto-optical recording medium, as illustrated in FIGS. 2A and 2B, has a structure in which a first auxiliary magnetic film 5 and a second auxiliary magnetic film 4 are sequentially laminated on a magneto-optical recording film 6, the magneto-optical recording film 6, the first auxiliary magnetic film 5 and the second auxiliary magnetic film 4 having magnetic characteristics such that when the Curie temperatures of the magneto-optical recording film, the first auxiliary magnetic film and the second auxiliary magnetic film are designated as $T_{C0}$, $T_{C1}$ and $T_{C2}$, respectively, and the critical temperatures of the first auxiliary magnetic film and the second auxiliary magnetic film are designated as $T_{CR1}$ and $T_{CR2}$, respectively, a relationship expressed as room temperature $<T_{CR2}<T_{CR1}<T_{C0}, T_{C1}, T_{C2}$ is satisfied. The first auxiliary magnetic film 5 and the second auxiliary magnetic film 4, as shown in FIG. 3, have magnetic characteristics such that each of them acts as a plane-magnetized film in a temperature range from room temperature to a certain critical temperature ($T_{CR}$) higher than room temperature, but acts as a perpendicular-magnetized film at a temperature above $T_{CR}$. The magneto-optical recording film 6 is a perpendicular-magnetized film at a temperature not lower than room temperature.

The principle of action (reproduction) of the first type of magneto-optical recording medium will now be described.

FIG. 2A shows the state of magnetization of each layer before reproduction after writing recorded magnetic domains into the magneto-optical recording film 6 by the optical modulation recording system or the like. When this medium is irradiated with reproducing light of a suitable power for making the peak temperatures of the magnetic films desired temperatures, a magnetic domain 22 of perpendicular magnetization in the magneto-optical recording film 6 is transferred to an area in the first auxiliary magnetic film 5 where the temperature has become higher than $T_{CR1}$. For this purpose, in view of a temperature profile within the medium developed upon irradiation with reproducing light as shown in FIG. 8, the reproducing power and $T_{CR1}$ are set so that a magnetic domain 21 of the same size as, or a smaller size than, the size of the magnetic domain in the magneto-optical recording film 6 will be transferred to the first auxiliary magnetic film 5.

Then, the magnetic domain 21 transferred to the first auxiliary magnetic film 5 is transferred to the second auxiliary magnetic film 4. According to the present invention, the critical temperatures of the first and second auxiliary magnetic films are set to satisfy $T_{CR2}<T_{CR1}$. Thus, as indicated by the temperature profile within the medium of FIG. 8, an area in the second auxiliary magnetic film which can become perpendicularly magnetized is larger in diameter than that in the first auxiliary magnetic film. As shown in FIG. 2B, therefore, a transferred magnetic domain 23 in the second auxiliary magnetic film 4 is enlarged by perpendicular magnetic anisotropy within the perpendicularly magnetizable area in the second auxiliary magnetic film, and an exchange coupling force resulting from the perpendicular magnetization in the first auxiliary magnetic film 5. This magnetic domain enlargement can be said to be promoted, since the planar magnetization in areas indicated at W of the first auxiliary magnetic film 5 in FIG. 2B weakens the exchange coupling force from magnetic domains S of the magneto-optical recording film 6 into the second auxiliary magnetic film 4. This magnetic domain enlargement curtails the decrease in the quantity of light contributing to a reproduction output due to magnetic masking by plane magnetization, thus permitting reproduction at a high C/N ratio.

The effect of enlargement of the magnetic domain 23 in the second auxiliary magnetic film 4 becomes maximal when the transferred magnetic domain in the second auxiliary magnetic film 4 is enlarged to a size larger than the diameter of a reproducing light spot. In this state, a very large reproduction output is obtained which is unrelated to the size or shape of the magnetic domain recorded in the magneto-optical recording film 6 and which is determined only by the figure of merit of the second auxiliary magnetic film 4 and the intensity of reproducing light beam. After reproduction, namely, after the reproducing laser light-irradiated area has moved, the readout area is cooled to $T_{CR2}$ or lower, whereupon the first and second auxiliary magnetic films are returned to a plane-magnetized state, the state of FIG. 2A. Even at temperatures during the reproducing action as described above, the coercivity of the magneto-optical recording film 6 is sufficiently high, so that the information recorded as magnetization is completely retained.

The second type of magneto-optical recording medium of the present invention, as illustrated in FIG. 7, is characterized by having a nonmagnetic film 9 between an auxiliary magnetic film 8 and a magneto-optical recording film 10, the magneto-optical recording film 10 and the auxiliary magnetic film 8 having magnetic characteristics such that when the Curie temperatures of the magneto-optical recording film and the auxiliary magnetic film are designated as $T_{C0}$ and $T_C$, respectively, and the critical temperature of the auxiliary magnetic film is designated as $T_{CR}$, a relationship expressed as room temperature $<T_{CR}<T_{C0}, T_C$ is satisfied.

The principle of reproduction of the second type of magneto-optical recording medium will now be described.

FIG. 6A schematically shows the state of magnetization of the auxiliary magnetic film 8, nonmagnetic film 9, and magneto-optical recording film 10 before reproduction after writing recorded magnetic domains into the magneto-optical recording film 10 of the medium shown in FIG. 7 by the optical modulation recording system or the like. When this magneto-optical recording medium is irradiated with reproducing light of a suitable power for making the peak temperatures of the magnetic films the desired temperatures, an area which can reach a temperature higher than $T_{CR}$ and can become perpendicularly magnetized occurs in the auxiliary magnetic film 8. The $T_{CR}$ and reproducing power are set so that the size of this area will become not smaller than the diameter of a magnetic domain M recorded in the magneto-optical recording film 10, preferably not smaller than the diameter of a reproducing light spot. The auxiliary magnetic film 8 has magnetic characteristics such that its coercivity has a distribution as shown in FIG. 9 in correspondence with a temperature distribution in the area above $T_{CR}$, and the values of the coercivity are sufficiently small in a region reaching the peak temperature and in the vicinity of the region.

The magneto-optical recording film 10, on the other hand, has magnetic characteristics such that its magnetization has a distribution as shown in FIG. 9 in correspondence with the temperature distribution in the area above $T_{CR}$, and the values of the magnetization are sufficiently large in a region reaching the peak temperature and in the vicinity of the region. Since the magnetic characteristics of the respective magnetic films have been set as described above, only the magnetic domain M in the high-temperature, sufficiently high magnetization region in the magneto-optical recording film 10 is transferred to the high-temperature, sufficiently low coercivity region in the auxiliary magnetic film 8 because of a great static magnetic coupling force between the magneto-optical recording film 10 and the auxiliary magnetic film 8 that acts in the region of the magnetic domain M. As a result, a sufficient reproduction resolving power is obtained.

Then, a magnetic domain 63 transferred to the auxiliary magnetic film 8 may have been enlarged by perpendicular magnetic anisotropy within the region above $T_{CR}$, and exchange coupling force from the transferred magnetic domain as shown in FIG. 6B. This magnetic domain enlargement strengthens reproduced signals and increases a C/N ratio, as with the first type of magneto-optical recording medium. After reproduction, namely, after the reproducing laser light has moved, the readout area is cooled to $T_{CR}$ or lower, whereupon the auxiliary magnetic film 8 turns into a plane-magnetized film, and returns to the state of FIG. 6A.

According to a second aspect of the present invention, there is provided a reproducing method for a magneto-optical recording medium, which reproduces a recorded signal by irradiating the magneto-optical recording medium with reproducing light, and detecting the magnitude of a magneto-optical effect, the magneto-optical recording medium having a magneto-optical recording film which is a perpendicular-magnetized film at a temperature not lower than room temperature, the reproducing method being characterized by:

using as the magneto-optical recording medium a magneto-optical recording medium having a first auxiliary magnetic film and a second auxiliary magnetic film sequentially laminated on a magneto-optical recording film, the first and second auxiliary magnetic films being magnetic films which transform from plane-magnetized films into perpendicular-magnetized films when exceeding their critical temperatures, and the magneto-optical recording film, the first auxiliary magnetic film and the second auxiliary magnetic film having magnetic characteristics such that when the Curie temperatures of the magneto-optical recording film, the first auxiliary magnetic film and the second auxiliary magnetic film are designated as $T_{C0}$, $T_{C1}$ and $T_{C2}$, respectively, and the critical temperatures of the first auxiliary magnetic film and the second auxiliary magnetic film are designated as $T_{CR1}$ and $T_{CR2}$, respectively, a relationship expressed as room temperature $<T_{CR2}<T_{CR1}<T_{C0}$, $T_{C1}$, $T_{C2}$ is satisfied; and irradiating the magneto-optical recording medium with reproducing light which is power-modulated with the same period as a reproduction clock or a period created by the multiplication of an integer (n) and the reproduction clock to reproduce a recorded signal.

According to a third aspect of the present invention, there is provided a reproducing method for a magneto-optical recording medium, which reproduces a recorded signal by irradiating the magneto-optical recording medium with reproducing light, and detecting the magnitude of a magneto-optical effect, the magneto-optical recording medium having a magneto-optical recording film which is a perpendicular-magnetized film at a temperature not lower than room temperature, the reproducing method being characterized by:

using as the magneto-optical recording medium a magneto-optical recording medium having an auxiliary magnetic film on the magneto-optical recording film via a nonmagnetic film, the auxiliary magnetic film transforming from a plane-magnetized film into a perpendicular-magnetized film when exceeding its critical temperature, the magneto-optical recording film and the auxiliary magnetic film having magnetic characteristics such that when the Curie temperatures of the magneto-optical recording film and the auxiliary magnetic film, are designated as $T_{C0}$ and $T_C$, respectively, and the critical temperature of the auxiliary magnetic film is designated as $T_{CR}$, a relationship expressed as room temperature $<T_{CR}<T_{C0}$, $T_C$ is satisfied; and irradiating the magneto-optical recording medium with reproducing light which is power-modulated with the same period as a reproduction clock or a period created by the multiplication of an integer (n) and the reproduction clock to reproduce a recorded signal.

It is desirable that the reproducing light is power-modulated so as to have reproducing light powers $Pr_1$ and $Pr_2$ with the same period as the period of the reproduction clock or a period which the reproduction clock multiplied by an integer (n≧2) makes, and one of the reproducing light powers $Pr_1$ and $Pr_2$ is a power for causing the magnetic domain enlargement of the auxiliary magnetic film.

The principle of the reproducing method complying with the third aspect of the present invention will be described with reference to FIG. 11, a schematic view of the reproducing method. In this reproducing method, the second type of magneto-optical recording medium shown in FIG. 6 is used. First, a predetermined record pattern as shown in FIG. 11(*a*) is recorded in the second type of magneto-optical recording medium by the optical modulation recording system or the like. In the drawing, record marks are recorded with the shortest mark pitch DP, and a record mark length DL is set such that DL=DP/2. During reproduction, pulsed laser light which has been modulated to two types of reproducing powers Pr2, Pr1 are projected onto the magneto-optical recording medium so that they will have a period DP synchronized with the record mark position and the emission width of the higher power Pr2 will be DL, as shown in FIG. 11(*b*). Light with the lower reproducing power Pr1 is projected always in an erase state (at sites without the record marks), while light with the higher reproducing power Pr2 is projected always in a record state (at sites with the record marks) and an erase state. FIG. 11(*c*) shows a reproduced signal waveform obtained by irradiation with reproducing pulsed laser light as shown in FIG. 11(*b*). FIG. 11(*d*), on the other hand, shows a reproduced signal waveform obtained by reproducing the same track with continuous light with a constant reproducing light power. Pr2 of Pr2 and Pr1 is selected to be a power which will bring about the magnetic domain enlargement of the auxiliary magnetic film 8, while Pr1 is selected to be a power which will cause the magnetic domain enlargement to vanish, as will be described later on. By so selecting the reproducing power, an amplitude $H_{p1}$ between the record state and the erase state observed with pulsed light reproduction can be set to have the relation $H_{p1}>H_{dc}$, where $H_{dc}$ is an amplitude with reproduction using constant laser light. Furthermore, magnetized information recorded in each magnetic domain of the magneto-optical recording film can be reproduced in an enlarged form independently of, and without influence from, adjacent magnetic domains.

BRIEF DESCRIPTION OF THE DRAWINGS

FIG. 2A is a concept view showing the state of magnetization, before reproduction, of each layer of the magneto-optical recording medium which belongs to the first type according to the present invention, while

FIG. 5A is a sectional view showing a laminated structure of a magneto-optical recording medium of a conventional type, while

FIG. 6A is a concept view showing the state of magnetization, before reproduction, of each layer of a magneto-optical recording medium which belongs to a second type according to the present invention, while

FIGS. 12A to 12E are graphs showing reproduced signal waveforms observed on an oscilloscope when the magneto-optical recording medium of Embodiment 2 of the present invention was reproduced using continuous light with various reproducing powers;

Embodiments of a magneto-optical recording medium and a reproducing method therefor according to the present invention will now be described in detail with reference to the accompanying drawings.

Embodiment 1

[Production of Magneto-Optical Recording Medium of First Type]

Figure 1:
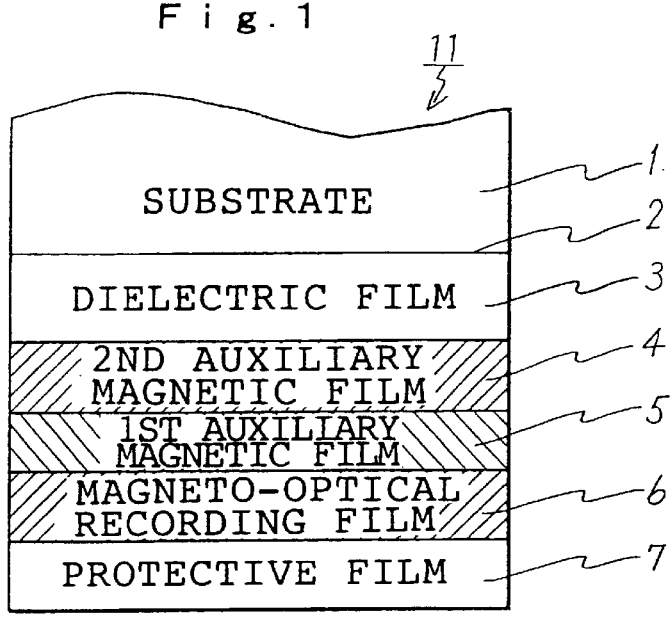
FIG. 1 is a sectional view conceptually showing a laminated structure of a magneto-optical recording medium which belongs to a first type according to the present invention.
Figure 2A:
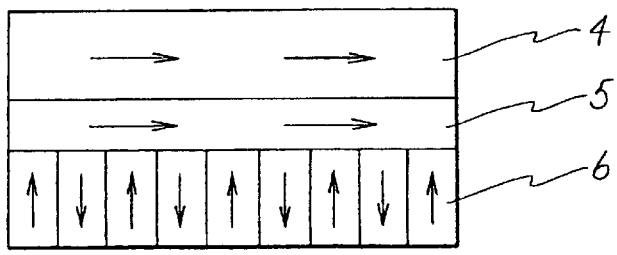
Figure 2B:
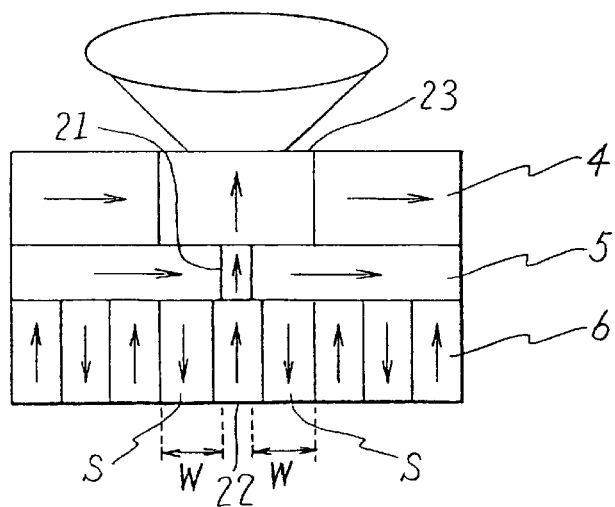
FIG. 2B is a concept view showing the state of magnetization, during reproduction, of each layer of the magneto-optical recording medium shown in FIG. 2A.

An example of the structure of a magneto-optical recording medium belonging to the first type according to the present invention is described by reference to FIG. 1. As shown in FIG. 1, a magneto-optical recording medium 11 belonging to the first type comprises a transparent substrate 1 having a desired preformat pattern 2 on one surface thereof, a dielectric film 3 formed on the preformat pattern 2, a second auxiliary magnetic film 4 formed on the dielectric film 3, a first auxiliary magnetic film 5 formed on the second auxiliary magnetic film 4, a magneto-optical recording film 6 formed on the first auxiliary magnetic film 5, and a protective film 7 formed on the magneto-optical recording film 6.

In the structure shown in FIG. 1, the transparent substrate 1 may be an arbitrary optically transparent substrate, e.g., a transparent resin material, such as polycarbonate or amorphous polyolefin, molded into a desired shape, or a glass plate in a desired form to whose surface is adhered a transparent resin film having a desired preformat pattern 2 transferred thereto. The dielectric film 3 is provided to cause multiple beam interference of a reproducing light beam in the film, thereby increasing an effective Kerr rotation angle. The dielectric film 3 may be formed of an inorganic dielectric comprising a substance having a larger refractive index than that of the transparent substrate, e.g., SiN. The protective film 7 serves to protect the films 3 to 6, laminated between the substrate 1 and the protective film 7, against adverse chemical influence from corrosion or the like. For instance, the protective film 7 comprises an SiN film. The magneto-optical recording film 6 is a perpendicular-magnetized film showing perpendicular magnetic anisotropy at a temperature not lower than room temperature. Its most preferred examples are amorphous alloys of rare earth metals and transition metals, such as TbFeCo, DyFeCo and TbDyFeCo. Other known magneto-optical recording materials, such as an alternating laminate of Pt films and Co films and garnet series oxide magnetic materials, can also be used.

Figure 3:
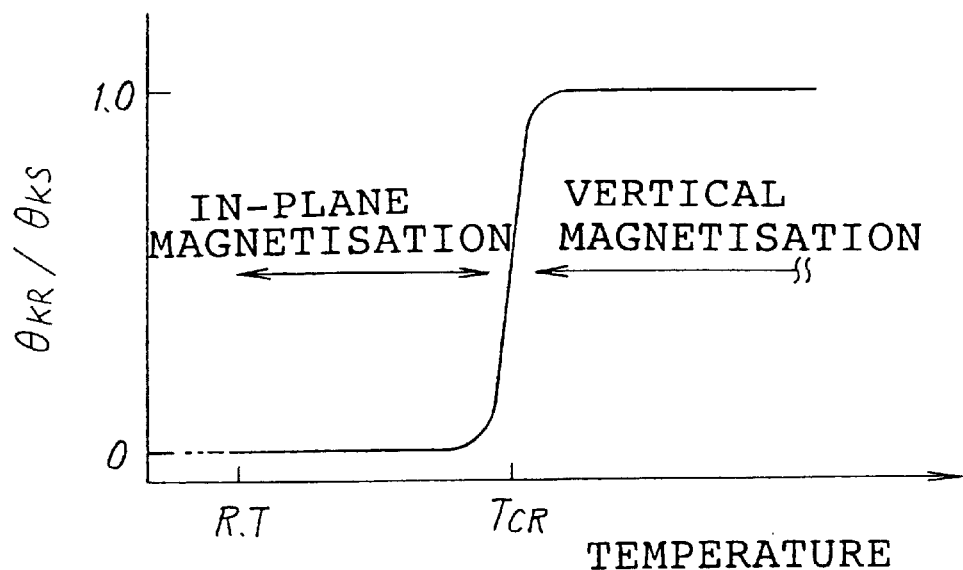
FIG. 3 is a view showing the magnetic characteristics of an auxiliary magnetic film constituting a magneto-optical recording medium of the present invention.

The first auxiliary magnetic film 5 and the second auxiliary magnetic film 4, as shown in FIG. 3, are each a plane-magnetized film in a temperature range from room temperature (R.T.) to a certain critical temperature ($T_{CR}$) above R.T., and each transforms into a perpendicular-magnetized film above $T_{CR}$. In this specification, the room temperature refers to an ambient temperature at which the magneto-optical recording medium is usually used. This temperature varies with the location of use, and is not restricted to a specific temperature. FIG. 3 shows the temperature dependence of $\theta_{KR}/\theta_{KS}$ ($\theta_{KR}$=residual Kerr rotation angle, $\theta_{KS}$=saturated Kerr rotation angle) determined from a hysteresis loop of a Kerr effect obtained when an external magnetic field was applied in a direction perpendicular to the surface of the film. As the material for the auxiliary magnetic film, an amorphous alloy of a rare earth metal and a transition metal, such as GdFeCo, GdFe, GdTbFeCo or GdDyFeCo, is most preferred.

The dielectric film 3, second auxiliary magnetic film 4, first auxiliary magnetic film 5, magneto-optical recording film 6, and protective film 7 can be formed, for example, by the dry process such as continuous sputtering using a magnetron sputtering device.

An example of the preparation of a magneto-optical recording medium of the first type shown in FIG. 1, i.e., a magneto-optical disk sample, will be shown below.

The sample was prepared by forming a dielectric film comprising an SiN film, a second auxiliary magnetic film comprising a $Gd_{25}Fe_{56}Co_{19}$ film (II), a first auxiliary magnetic film comprising a $Gd_{28}Fe_{53}Co_{19}$ film (I), a magneto-optical recording film comprising a $Tb_{21}Fe_{66}CO_{13}$ film, and a protective film comprising an SiN film, in this order as adherends by a sputtering method. The thicknesses and magnetic characteristics of the respective auxiliary magnetic films and the magneto-optical recording film are shown in FIG. 1. In this table, $T_C$ stands for the Curie temperature, and $T_{CR}$ stands for a critical temperature at which the auxiliary magnetic film changes its form from a plane-magnetized film to a perpendicular-magnetized film.

TABLE 1

|  | Material | Film Thickness (nm) | $T_C$ (° C.) | $T_{CR}$ (° C.) |
|---|---|---|---|---|
| Magneto-Optical Recording Film | TbFeCo | 50 | 270 | — |
| First Auxiliary Magnetic Film | GdFeCo (I) | 60 | >400 | 200 |
| Second Auxiliary Magnetic Film | GdFeCo (II) | 50 | >400 | 90 |

Figure 4:
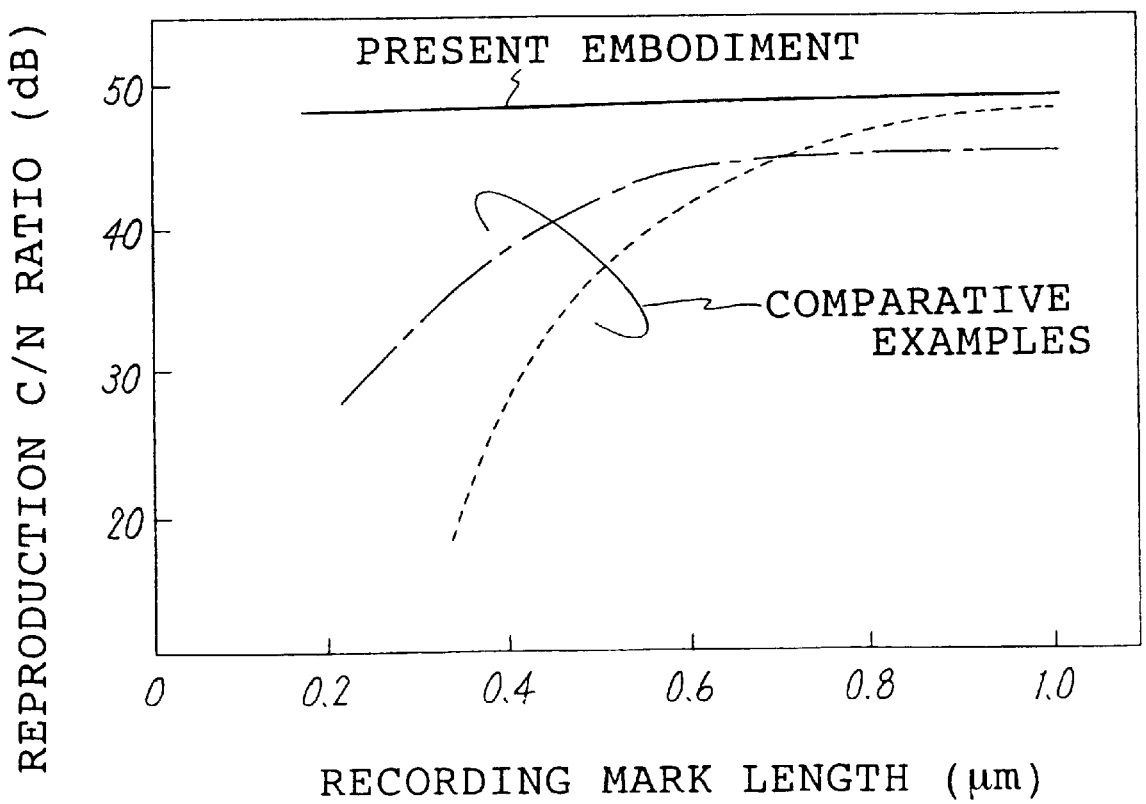
FIG. 4 is a graph showing the relation between reproduction C/N ratios and record mark lengths in a magneto-optical recording medium produced in Embodiment 1 of the present invention and conventional types of magneto-optical recording media.
Figure 5A:
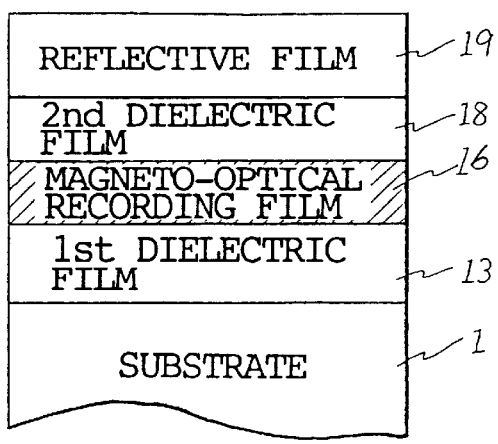
Figure 5B:
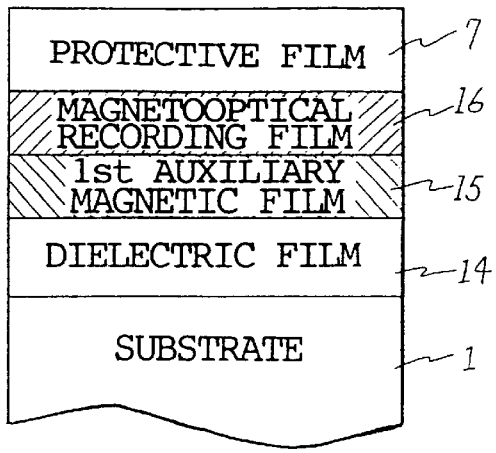
FIG. 5B is a sectional view showing a laminated structure of a magneto-optical recording medium of a magnetic super-resolution type.
Figure 6A:
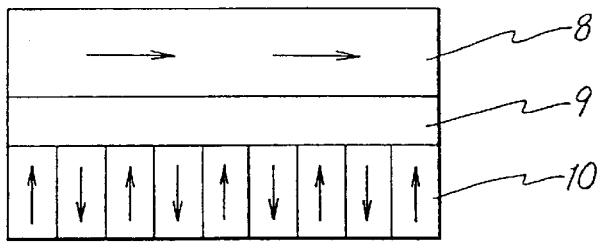
Figure 6B:
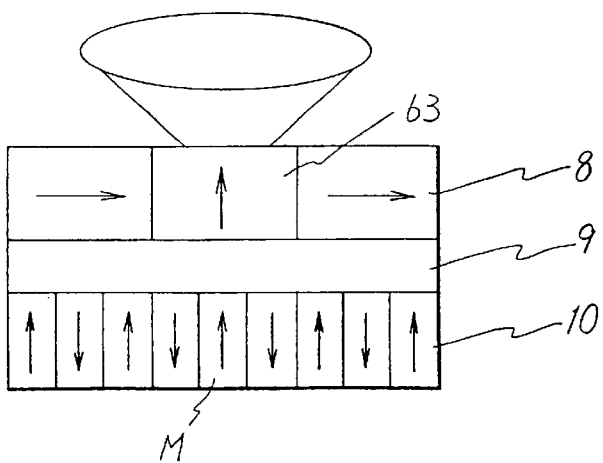
FIG. 6B is a concept view showing the state of magnetization, during reproduction, of each layer of the magneto-optical recording medium shown in FIG. 6A.

Test signals were recorded in a data record region of the prepared disk by a magneto-optical modulation system which performs recording by modulating an external magnetic field in response to record signals while irradiating the disk with a laser beam as pulses with a constant period. The duty factor of the recording light pulses was 50%. The test signals were given so that record marks with various record mark lengths would be formed. Then, the record marks of various lengths were reproduced using an objective lens with a numerical aperture NA=0.55, a pickup with a laser wavelength of 780 nm at a linear velocity of 7.5 m/sec, a read power of 2.5 mW, and an external magnetic field during reproduction of zero. The recorded magnetic domain length dependence of the reproduction C/N ratio (C=carrier level, N=noise level) measured is shown in FIG. 4. In FIG. 4, data on two conventional types of magneto-optical recording media are also revealed for comparison. Data expressed as a dashed line are reproduction data on the conventional type of magneto-optical recording medium shown in FIG. 5A, which uses TbFeCo as a single layer magneto-optical recording film 16. Data as a one-dot chain line are the results on a magnetic super-resolution (MSR) disk constituted by two magnetic layers, i.e., a TbFeCo magneto-optical recording film 16 and a GdFeCo first auxiliary magnetic film 15 as shown in FIG. 5B. From the results of FIG. 4, it is seen that the sample disk concerned with the instant embodiment (data are represented by a solid line) gives a markedly higher reproduction C/N ratio even at a record mark length of 0.2 μm in comparison with the two types of conventional disks. Thus, the use of the present invention can reproduce very tiny record marks beyond the conventional reproduction limits, and is capable of increasing the recording density.

According to the present embodiment, the three magnetic films, i.e., magneto-optical recording film 6, first auxiliary magnetic film 5 and second auxiliary magnetic film 4, were laminated together in intimate contact, and the respective films were exchange-coupled. However, a nonmagnetic film may be inserted between the magneto-optical recording film 6 and the first auxiliary magnetic film 5 or/and between the first auxiliary magnetic film 5 and the second auxiliary magnetic film 4, whereby the adjacent magnetic films are magnetostatically coupled together.

In the instant embodiment, the two auxiliary magnetic films were used, but an n (n≧3) number of auxiliary magnetic films may be laminated sequentially, with the $T_{CR}$ (a critical temperature at which transformation from a plane-magnetized film into a perpendicular-magnetized film occurs) of each layer being set at $T_{CR1}>T_{CR2}>\ldots>T_{CRn}>$ room temperature (where $T_{CRi}$ is the $T_{CR}$ of the ith auxiliary magnetic film). In this case, the first auxiliary magnetic film is provided on the magneto-optical recording film 6 side, while the nth auxiliary magnetic film is provided on the dielectric film 3 side.

To impart a desired shape to the temperature profile of the medium when irradiated with a reproducing light beam, or to decrease the linear velocity dependence of the temperature profile, it is permissible to provide a thermal control film with a suitable heat conductivity on the protective film 7 of the magneto-optical recording medium 11.

In this embodiment, ordinary DC laser light was used for reproduction. However, as in Embodiment 2 to be described later on, it is possible to perform reproduction using pulsed laser light with a frequency corresponding to the shortest mark length, thereby obtaining a better reproduction C/N ratio.

To obtain an even better reproduction C/N ratio, a reproducing magnetic film whose Kerr rotation angle θk at the peak temperature of the medium when irradiated with reproducing light is not less than the θk of the second auxiliary magnetic film 4 and which is a perpendicular-magnetized film at room temperature or higher may be additionally provided between the dielectric film 3 and the second auxiliary magnetic film 4.

Embodiment 2

This embodiment shows examples of a medium belonging to a magneto-optical recording medium of the second type according to the present invention, and a reproducing method for performing reproduction with reproducing laser light varied in a pulsed form by the use of this medium. The magneto-optical recording medium used is a medium having a structure as shown in FIG. 7.

[Production of Magneto-Optical Recording Medium of Second Type]

Figure 7:
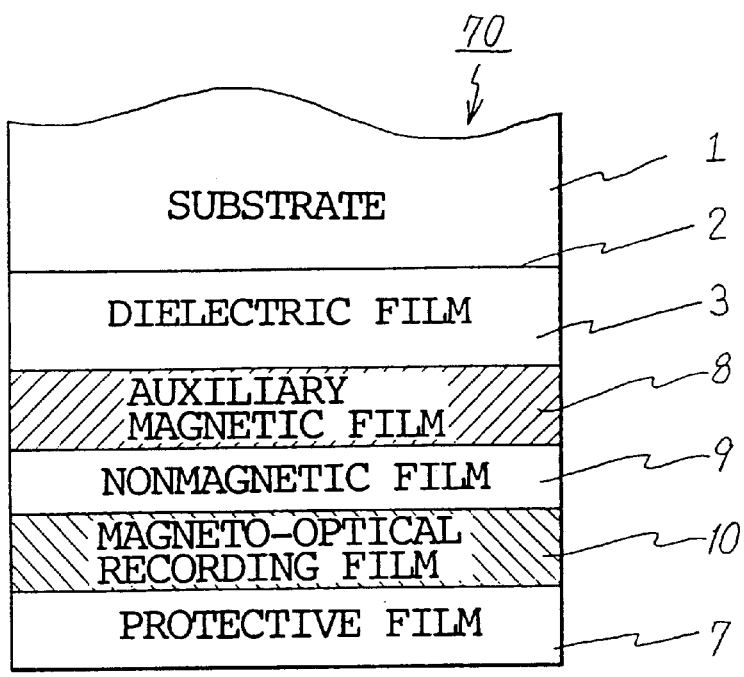
FIG. 7 is a view conceptually showing a laminated structure of a magneto-optical recording medium which belongs to a second type according to the present invention.
Figure 8:
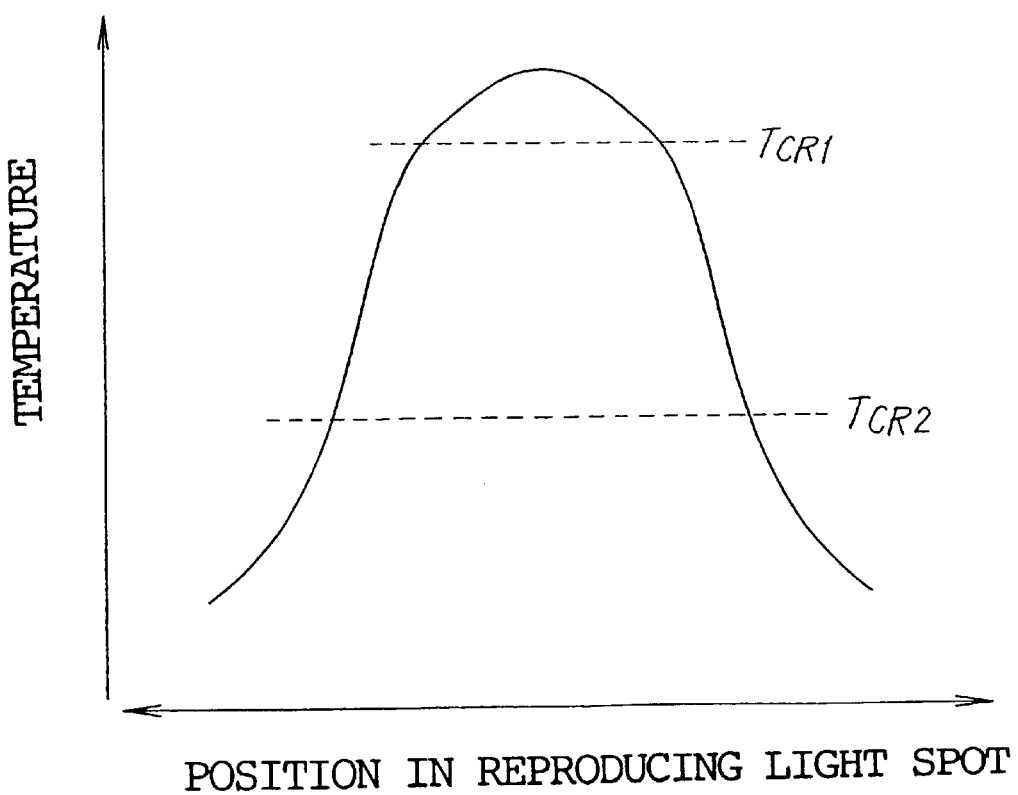
FIG. 8 is a graph showing a temperature profile of a readout area obtained when the magneto-optical recording medium of the first type according to the present invention is irradiated with reproducing light.
Figure 9:
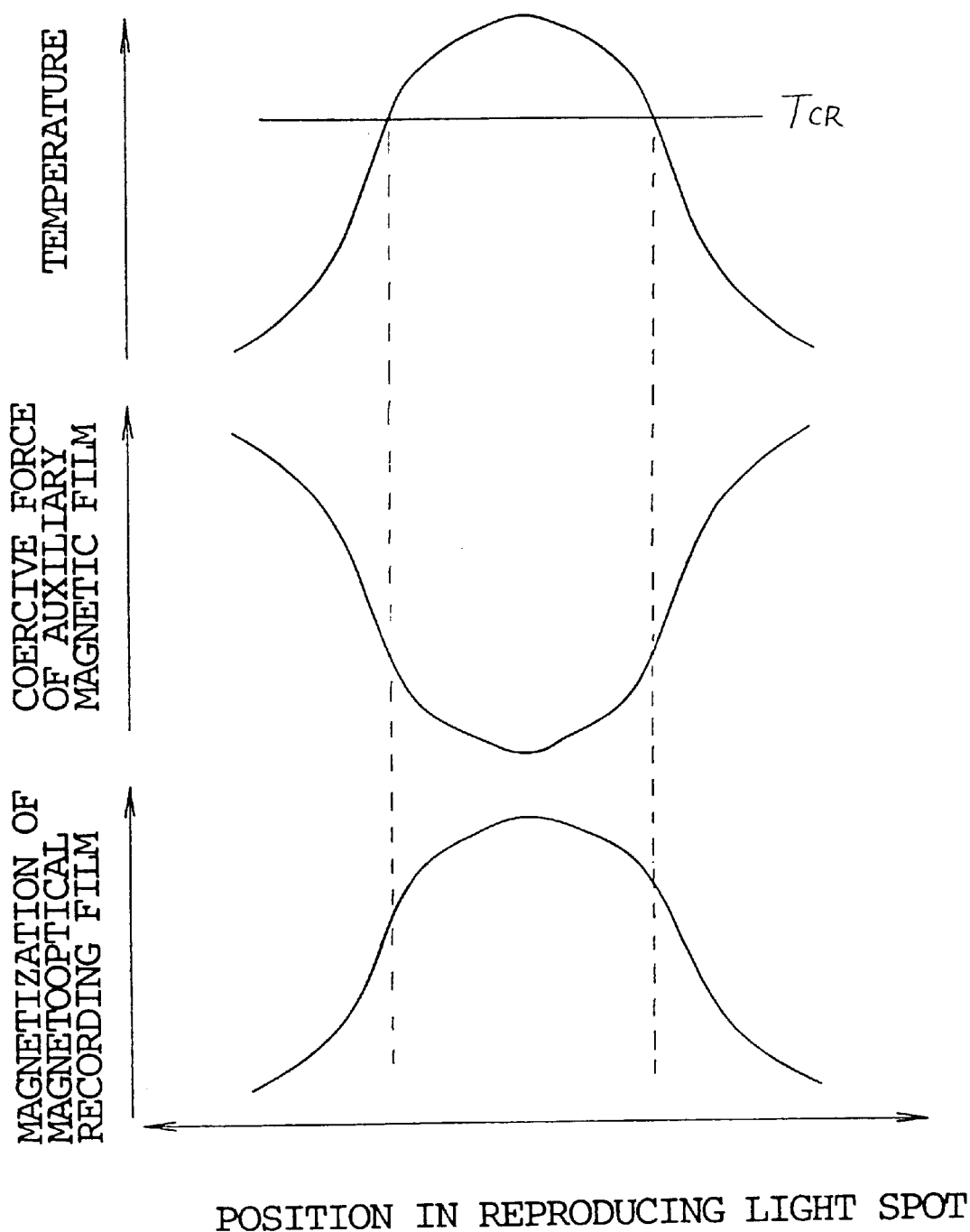
FIG. 9 is a graph showing temperature and coercivity profiles of an auxiliary magnetic film of the magneto-optical recording medium of the second type according to the present invention, as well as a magnetization profile of the magneto-optical recording medium.

A glass substrate is used as a transparent substrate 1 of a magneto-optical recording medium 70 shown in FIG. 7. On one surface of the glass substrate, a transparent resin film 2 having a preformat pattern transferred thereto is formed. A dielectric film 3 comprises SiN, and is formed with such a film thickness as to cause multiple beam interference of reproducing laser light, thereby increasing an effective Kerr rotation angle. An auxiliary magnetic film 8 comprises a ferromagnetic amorphous alloy of a rare earth metal and a transition metal, GdFeCo, and exhibits plane magnetic anisotropy in a temperature range from room temperature to a certain critical temperature $T_{CR}$ higher than room temperature, and perpendicular magnetic anisotropy above $T_{CR}$. A nonmagnetic film 9 comprises SiN, and is inserted to magnetostatically couple the auxiliary magnetic film 8 and a magneto-optical recording film 10 together. The magneto-optical recording film 10 comprises a ferromagnetic amorphous alloy of a rare earth metal and a transition metal, TbFeCo, and exhibits perpendicular magnetic anisotropy in a temperature range from room temperature to the Curie temperature. A protective film 7 comprises SiN, and is provided to protect the thin films laminated between the substrate 1 and the protective film 7 from adverse chemical influence exerted by corrosion or the like.

The dielectric film 3, auxiliary magnetic film 8, nonmagnetic film 9, magneto-optical recording film 10 and protective film 7 were prepared to the following film thicknesses by continuous sputtering using a magnetron sputtering device: 60 nm for the dielectric film 3, 60 nm for the auxiliary magnetic film 8, 20 nm for the nonmagnetic film 9, 50 nm for the magneto-optical recording film 10, and 60 nm for the protective film 7.

The composition of TbFeCo constituting the magneto-optical recording film 10 is $Tb_{21}Fe_{66}Co_{13}$ expressed as atomic ratio (%). In this composition, the magnetized components of the transition metals show predominant characteristics compared with the magnetized component of the rare earth metal in a range from room temperature to the Curie temperature $T_{C0}=270°$ C. The composition of GdFeCo constituting the auxiliary magnetic film 8, on the other hand, is $Gd_{28}Fe_{53}Co_{19}$ expressed as atomic ratio (%), and shows, as a single-layer film, the temperature characteristics of the Kerr rotation angle given in FIG. 10.

Figure 10:
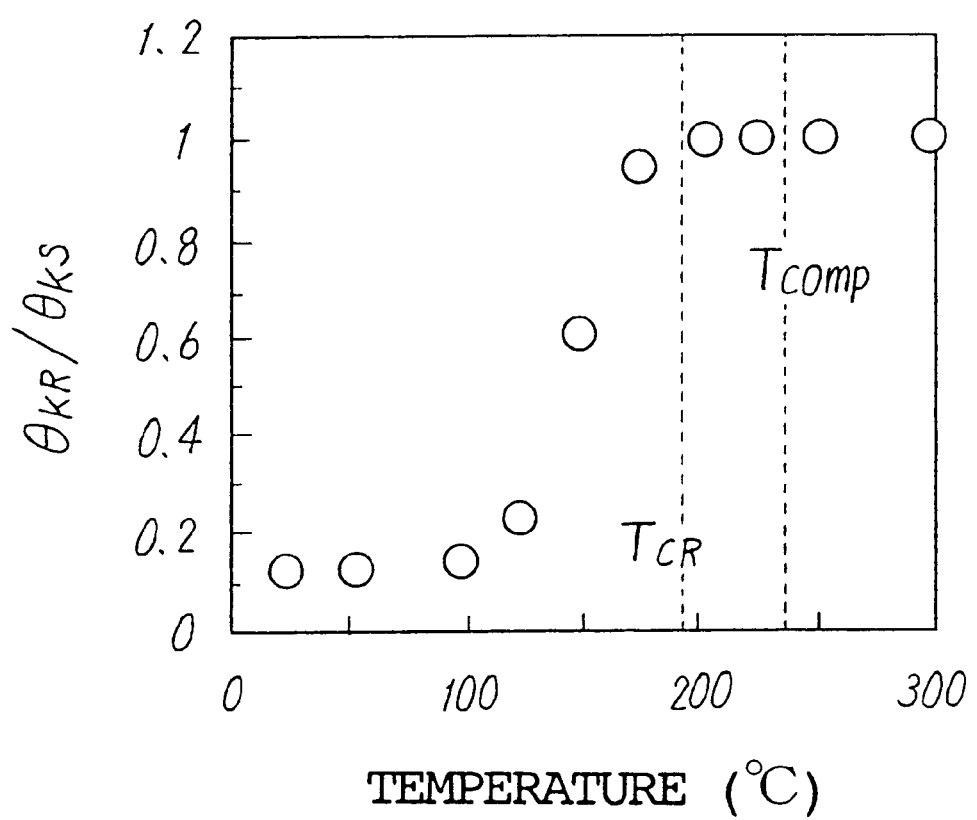
FIG. 10 is a graph showing the temperature characteristics of a Kerr effect of an auxiliary magnetic film of a magneto-optical recording medium produced by Embodiment 2 of the present invention.

The horizontal axis of FIG. 10 represents temperature, while the vertical axis represents the ratio of the residual Kerr rotation angle $\theta_{KR}$ to the saturated Kerr rotation angle $\theta_{KS}$ of the GdFeCo auxiliary magnetic film 8, i.e., $\theta_{KR}/\theta_{KS}$, determined from the hysteresis of the Kerr rotation angle versus temperature. From this graph, one sees that the critical temperature $T_{CR}$ beyond which the auxiliary magnetic film 8 changes from a plane-magnetized film to a perpendicular-magnetized film is about 200° C. The auxiliary magnetic film 8 has a Curie temperature $T_C$ of 300° C. or higher, and also has a compensation temperature $T_{comp}$ between room temperature $T_{room}$ to the Curie temperature, the $T_{comp}$ being about 230° C. The relationship among the critical temperature $T_{CR}$, compensation temperature $T_{comp}$ and Curie temperature $T_C$ of the auxiliary magnetic film 8 and the Curie temperature $T_{C0}$ of the magneto-optical recording film 10 is as follows: $T_{room}<T_{CR}<T_{comp}<T_{C0}<T_C$. Satisfaction of these conditions extremely facilitates reproduction using power-modulated pulsed light to be described later on.

Figure 11:
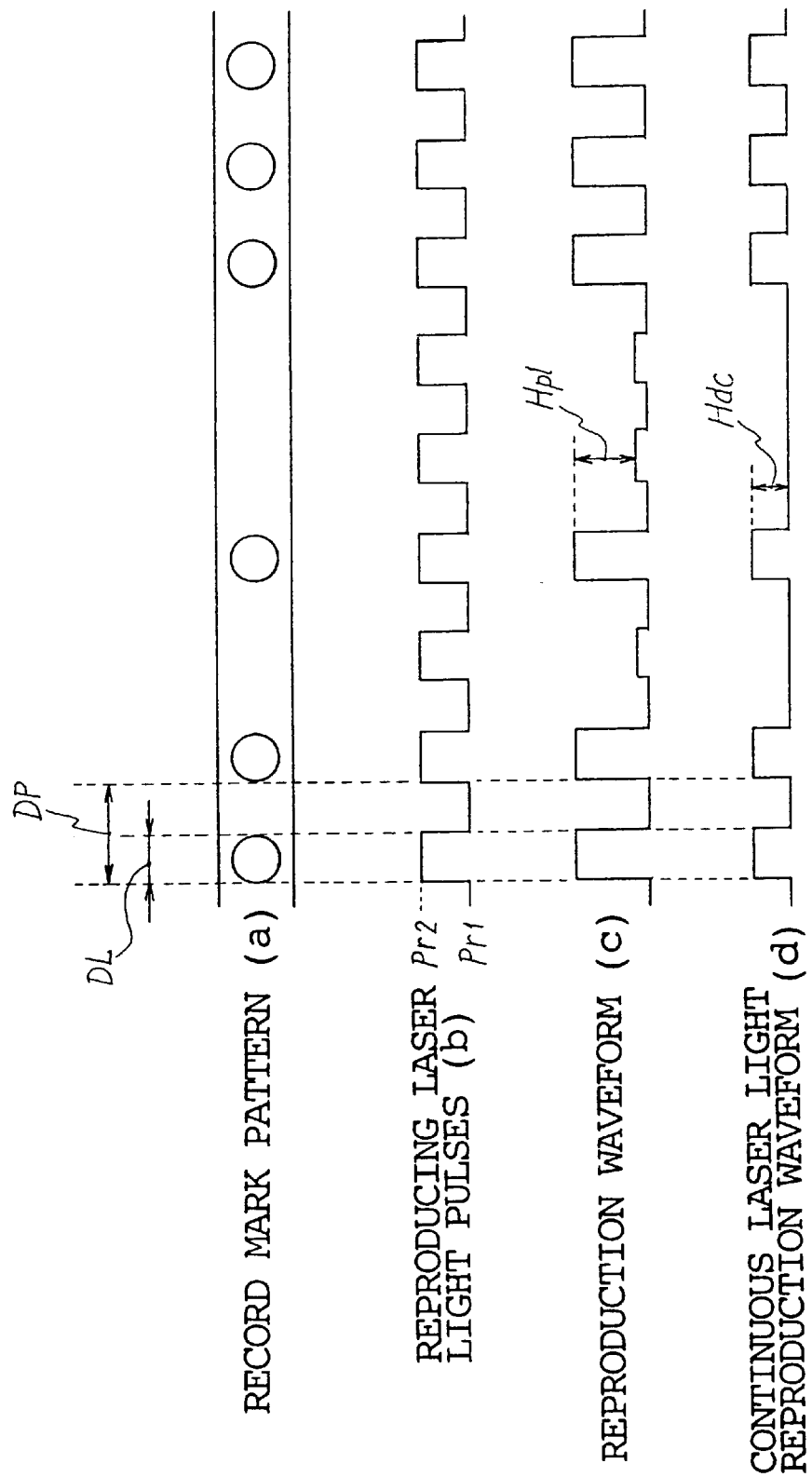
FIG. 11 is a timing chart for explaining the principle of a reproducing method for a magneto-optical recording medium according to the present invention.

Using the magneto-optical recording medium 70 of the foregoing structure, the reproducing method as explained in the description of the principle of the present invention in connection with FIG. 11 will be carried out.

[Preliminary Experiments for Determination of Reproducing Laser Pulse Intensity]

According to the reproducing method of the present invention, enlarged reproduction of recorded magnetic domains is performed using pulsed light with a laser power-modulated to a higher power Pr2 and a lower power Pr1. For this purpose, preliminary experiments are conducted first to determine optimum laser powers for Pr2 and Pr1 by which to reproduce data recorded in the magneto-optical recording medium 70. In these preliminary experiments, a magneto-optical drive having an optical system with a laser light wavelength of 680 nm and a numerical aperture of 0.55 is used, and recording/reproducing laser light is projected from the substrate 1 side (auxiliary magnetic film 8 side). Reproducing laser light used is continuous light, which is changed to various powers so that reproduced signal waveforms will be observed, as described later.

On a track situated at a radius of 40 mm of an initialized magneto-optical recording medium 70, optical modulation recording was performed at a linear velocity of 5.0 m/s using laser light having a recording power of 4.5 mW and modulated to a period of 640 ns and a pulse width of 213 ns while applying a recording magnetic field of 500 Oe. As a result, record marks about 1.6 μm were continuously recorded on the track with a pitch of 3.2 μm.

Then, the track where the record marks were recorded was reproduced with continuous light having various reproducing powers Pr. To decide on the optimum modulating conditions for the reproducing power, the values of the power Pr of continuous light were changed in five grades, Pr=1.0 mW, 1.5 mW, 1.9 mW, 2.0 mW and 2.1 mW, and reproduced signals were obtained. During reproduction, no magnetic field was applied to the magneto-optical recording medium 70, but a magnetic field leak (about 80 Oe) from the actuator of the optical head occurred in the direction of recording.

Reproduction waveforms upon reproduction from the recorded track of the magneto-optical recording medium 70 using the reproducing powers Pr are shown in FIGS. 12A to 12E. The reproduction waveform itself was put under a trigger, and the resulting waveform was observed with an oscilloscope. FIG. 12A shows a reproduction waveform at a reproducing light power Pr=1.0 mW, which indicates rises in reproduced signals in response to the pattern of the record marks. On the graph, the baseline represents an erase state, while the rising peak signals represent a record state. The amplitude between the record state and the erase state was 50 mV. When the reproducing light power was increased to Pr=1.5 mW, the signal amplitude increased to about 200 mV, as shown in FIG. 12B. From the waveform of FIG. 12B, one will see that adjacent peak signals are connected together on the record state side in some regions of the waveform.

FIG. 12C gives a reproduced signal waveform at a reproducing power of Pr=1.9 mW, showing a waveform comprising peak signals completely connected together on the record state side (the upper part in the drawing). This shape shows that, as will be described later on, magnetic domain enlargement occurs in the auxiliary magnetic film, and enlarged magnetic domains move on the track as the track is scanned with a reproducing light spot. When the reproducing light power is further raised to Pr=2.0 mW, the connected peak signals begin to be interrupted, as shown in FIG. 12D. In this case, the amplitude $H_{plo}$, between the connected part of the peak signals and the baseline was about 350 mV. Further raising the reproducing light power to Pr=2.1 mW results in the complete interruption of peak signals as shown in FIG. 12E, revealing a waveform corresponding to the pattern of record marks. In FIG. 12E, the amplitude between the record state and the erase state was 200 mV.

Figure 13A:
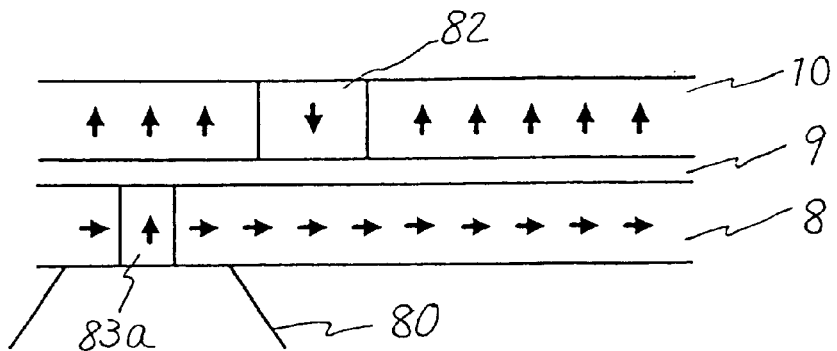
FIGS. 13A to 13C are concept views illustrating the state of magnetization of each layer of the magneto-optical recording medium which gave the signal waveform shown in FIG. 12A.
Figure 13B:
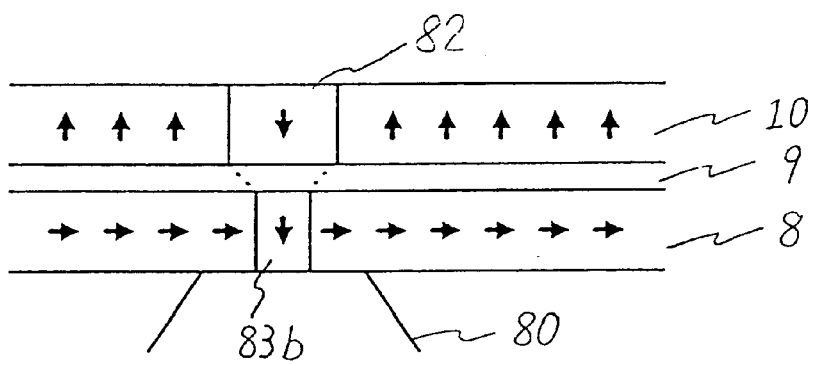
Figure 14A:
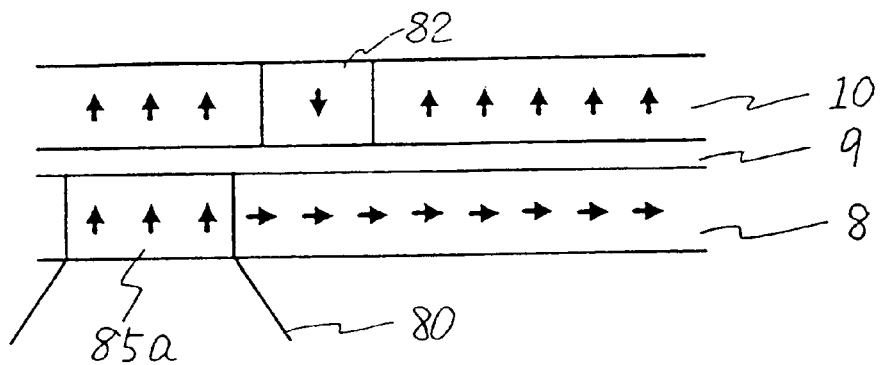
FIGS. 14A to 14C are concept views illustrating the state of magnetization of each layer of the magneto-optical recording medium which gave the signal waveform shown in FIG. 12C.
Figure 14B:
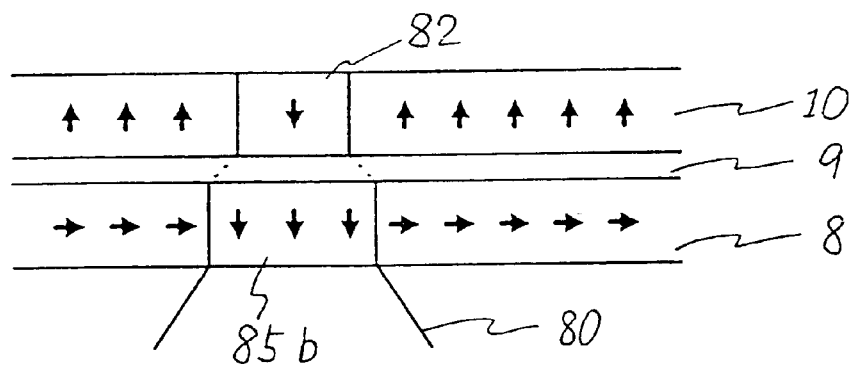
Figure 14C:
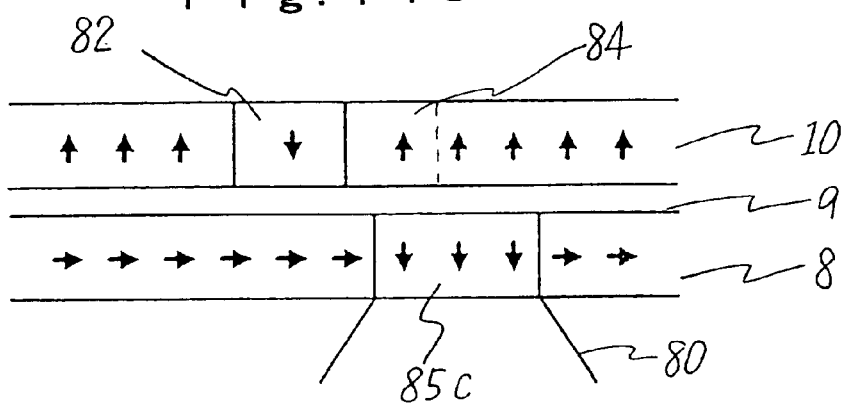
Figure 15A:
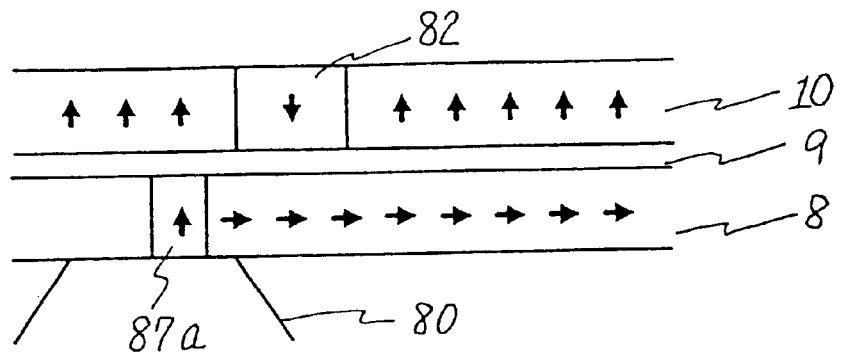
FIGS. 15A to 15C are concept views illustrating the state of magnetization of each layer of the magneto-optical recording medium which gave the signal waveform shown in FIG. 12E.
Figure 15B:
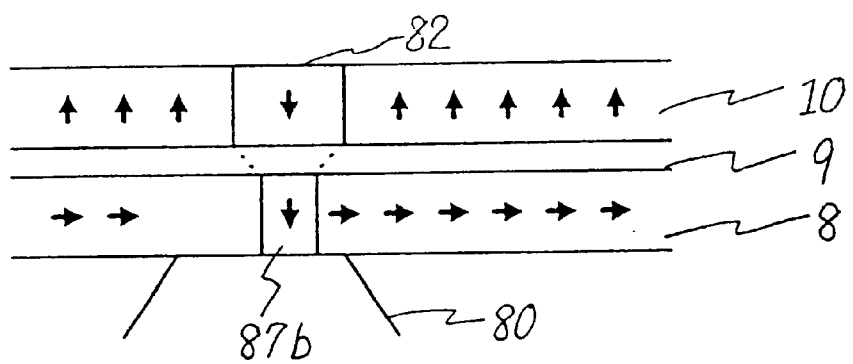
Figure 15C:
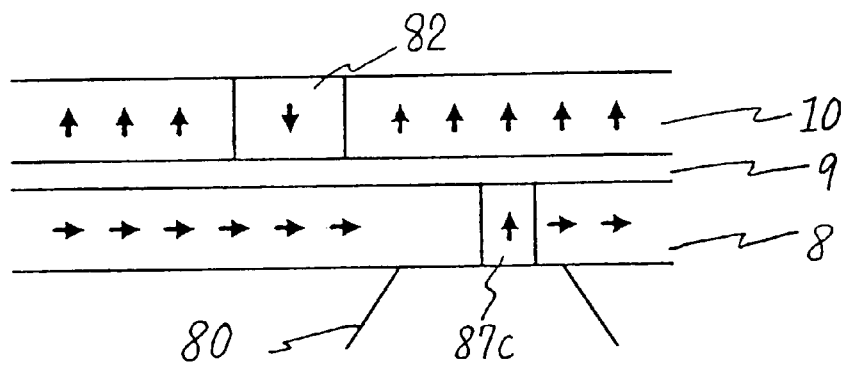

FIGS. 13 to 15 are concept views illustrating the state of magnetization of the magneto-optical recording medium 10 laminated via the auxiliary magnetic film 8 and the nonmagnetic film 9 from which the reproduction waveforms of FIGS. 12A to 12E are obtained. FIG. 13 shows the relation between a reproducing light spot 80 leading to the signal waveform of FIG. 12A (reproducing light power Pr=1.0 mW) and the direction of magnetization of the auxiliary magnetic film 8 irradiated therewith and the magneto-optical recording film 10. Initially, as shown in FIG. 13A, the auxiliary magnetic film 8 irradiated with the reproducing light spot 80 gains perpendicular magnetization in a region in which its temperature becomes higher than its critical temperature $T_{CR}$. Also, the magnetization of the magneto-optical recording film 10 is transferred to a region 83a of the auxiliary magnetic film by magnetostatic coupling. As shown in FIG. 13B, when the reproducing light spot 80 comes directly below a magnetic domain 82 where magnetization heads in the recording direction (i.e., recorded magnetic domain), the magnetization of the recorded magnetic domain 82 is transferred to the auxiliary magnetic film 8 by magnetostatic coupling. In this case, the reproducing light power Pr is as low as 1.0 mW, so that only the central area of the auxiliary magnetic film 8 within the optical spot 80, i.e., a region 83*b*, exceeds the critical temperature $T_{CR}$, and the transferred region 83*b* of the auxiliary magnetic film 8 does not become larger than the width of the recorded magnetic domain 82. Hence, the reproduced signal strength is small as shown in FIG. 12A. After the reproducing light spot 80 passes the recorded magnetic domain 82, a transfer region 83*c* acquires the same direction of magnetization as the magnetic domain of the magneto-optical recording film 10 that is directly above the transfer region 83*c*, as a result of transfer from this magnetic domain of the magneto-optical recording film 10.

FIG. 14 shows the relation between a reproducing light spot 80 leading to the signal waveform of FIG. 12C (reproducing light power Pr=1.9 mW) and the direction of magnetization of the auxiliary magnetic film 8 irradiated therewith and the magneto-optical recording film 10. In this case the reproducing light power is relatively large (1.9 mW), so that a region 85*a* in the entire spot of the auxiliary magnetic film 8 irradiated with the reproducing light spot 80 reaches a temperature higher than the critical temperature $T_{CR}$, obtaining perpendicular magnetization, as shown in FIG. 14A. Because of magnetostatic coupling emerging from the magneto-optical recording film 10, a magnetic domain of the magneto-optical recording film 10 is transferred to the region 85*a*. Upon scanning by the reproducing light spot 80, the reproducing light spot 80 comes directly below a recorded magnetic domain 82, as shown in FIG. 14B. On this occasion, magnetization of the recorded magnetic domain 82 is transferred. In this case, a region 85*b* of the auxiliary magnetic film 8 that has risen above the critical temperature $T_{CR}$ is larger in width than the recorded magnetic domain 82. Hence, it follows that the recorded magnetic domain 82 has been transferred into the auxiliary magnetic film 8 in an enlarged manner. This expansion of magnetic domain results in a large signal waveform. Even after the reproducing light spot 80 passes the recorded magnetic domain 82, a region 85*c* maintains the same magnetized state as the region 85*b*, thus providing a waveform of connected reproduced signal peaks as shown in FIG. 12C.

Figure 13C:
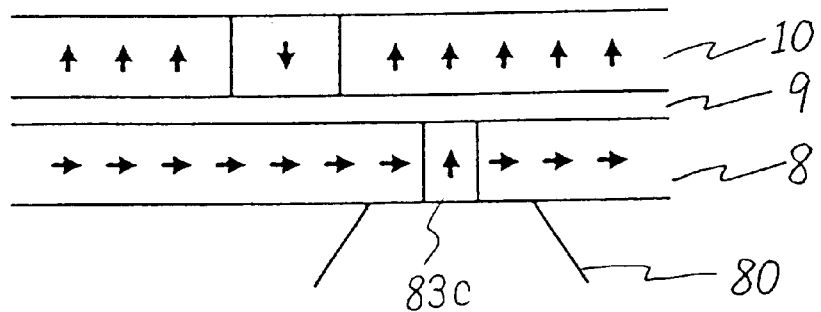

The reason why the region 85*c* maintains the same magnetized state as the region 85*b* even after passage of the reproducing light spot 80 beside the recorded magnetic domain 82 in FIG. 14 may be as follows: Irradiation with a reproducing laser beam heats the auxiliary magnetic layer 8 to a temperature higher than the critical temperature, thereby making it a perpendicular-magnetized film and imparting a perpendicular coercivity Hc thereto. During reproduction, moreover, the auxiliary magnetic layer 8 is subjected to an external magnetic field $H_{ex}$ due to a leakage magnetic field from an actuator, etc., of an optical head, and a static magnetic field Hs which the magnetization of the magneto-optical recording film 10 generates at the critical temperature of the auxiliary magnetic layer 8. The total magnitude of the thus applied magnetic fields is $H_{ex}$+Hs, or $H_{ex}$–Hs, depending on the direction of the magnetization. Assume the resultant magnetic field from the external magnetic field $H_{ex}$ and the static magnetic field Hs may be in the following relationship with the coercivity Hc of the auxiliary magnetic film 8: $H_{ex}$+Hs>Hc, or $H_{ex}$–Hs<Hc. In this case, as shown in FIG. 14C, the magnetic domain once transferred to the auxiliary magnetic film does not undergo reinversion, even when the reproducing spot advances to a region of the magneto-optical recording film 10 where no recorded magnetic domain exists (the direction of magnetization in the recording film 10 is ↑) The Hc is the coercivity in the perpendicular direction of the auxiliary magnetic film 8 in a perpendicular-magnetized state. In the case of FIG. 13, the temperature of the auxiliary magnetic layer subjected to transfer by a low reproducing power is relatively low, so that the Hc of the auxiliary magnetic layer is lower than in FIG. 14. Consequently, the magnetic domain transferred to the auxiliary magnetic layer 8 undergoes reinversion when the reproducing spot advances to a region of the magneto-optical recording film 10 where no recorded magnetic domain exists (FIG. 13C).

FIG. 15 shows the relation between a reproducing light spot 80 leading to the signal waveform of FIG. 12E (reproducing light power Pr=2.1 mW) and the direction of magnetization of the auxiliary magnetic film 8 irradiated therewith and the magneto-optical recording film 10. In this case, the reproducing light power is as large as 2.1 mW, so that a region 87*a* in a forward portion in the spot of the auxiliary magnetic film 8 irradiated with the reproducing light spot 80 reaches a temperature higher than the critical temperature $T_{CR}$, showing perpendicular magnetization. A central and a rear portion (with respect to a direction of movement of the spot) in the spot, on the other hand, are heated to a higher temperature than the forward portion, exceeding the Curie temperature $T_C$ of the auxiliary magnetic film 8 and probably falling into a demagnetized state. As shown in FIG. 15A, therefore, only the region 87*a* in the forward portion of the auxiliary magnetic film 8 in the reproducing light spot 80 undergoes magnetic domain transfer from the magneto-optical recording film 10 lying directly above it because of magnetostatic coupling. Then, upon scanning of the track by the reproducing light spot 80, the reproducing light spot 80 comes directly below a recorded magnetic domain 82. On this occasion, magnetization of the recorded magnetic domain 82 is transferred only to a relatively low temperature region 87*b* in the forward portion of the auxiliary magnetic film 8. Thus, magnetic domain enlargement does not occur, and the resulting reproduced signal strength is not as high as in FIG. 12C. After the reproducing light spot 80 passes the recorded magnetic domain 82, a transfer region 87*c* undergoes transfer of the same direction of magnetization as in the magnetic domain of the magneto-optical recording film 10 lying directly above it as a result of magnetostatic coupling resulting from the magneto-optical recording film 10. The reason is as follows: The auxiliary magnetic film 8 undergoing transfer by the high reproducing power has an area exceeding the Curie temperature. This makes the $H_C$ of the auxiliary magnetic film 8 lower than in FIG. 14. Consequently, the magnetic domain transferred to the auxiliary magnetic film 8 faces reinversion, when the reproducing light spot advances to a region of the magneto-optical recording film 10 where no recorded magnetic domain exists.

In cases shown in FIG. 12C and FIG. 14, magnetic domain enlargement takes place in the auxiliary magnetic film 8 as stated earlier, thus increasing the reproduced signal strength. The magnetic domain 85*b* expanded from the recorded magnetic domain 82 moves in an expanded state along with the reproducing light spot 80. When the center of the reproducing light spot 80 comes directly below a magnetic domain 84 adjacent to the recorded magnetic domain 82 in FIG. 14C, however, there is need to erase a magnetic domain 85*c* expanded from the recorded magnetic domain 82 and reproduce the magnetic domain 84 in an enlarged form. On the other hand, when the reproducing powers Pr are relatively small (Pr=1.0 mW) and relatively large (Pr=2.1 mW) as shown in FIGS. 13 (corresponding to FIGS. 12A) and 15 (corresponding to FIG. 12E), the magnetic domain 83b transferred from the recorded magnetic domain 82 disappears, after passage of the reproducing light spot 80 beside the recorded magnetic domain 82. A magnetic domain (in the erase direction in the drawing) of the magneto-optical recording film 10 present directly above the reproducing light spot 80 has been transferred to the auxiliary magnetic film 8. Hence, pulsed light power-modulated with a reproduction clock period (or a period created by the multiplication of an integer (n) and the reduction clock period) to a reproducing light power Pr=1.9 mW causing magnetic domain enlargement and a reproducing light power Pr=2.1 mW (or 1.0 mW) causing no magnetic domain enlargement is used as reproducing light. Because of this use, reproduced signals can be obtained in an strengthened form by magnetic domain enlargement. Also, when the center of the reproducing light spot has moved from a site above the recorded magnetic domain of the magneto-optical recording film to a site above the adjacent recorded magnetic domain, a magnetic domain transferred in an enlarged form from this recorded magnetic domain can be eliminated.

The results of the foregoing preliminary experiments show that when reproducing laser light is given as pulsed light intensity modulated to Pr=1.9 mW in FIG. 12C and Pr=2.1 mW in FIG. 12E, a reproduced signal is detected as a difference between the reproduced signal strengths obtained in FIGS. 12C and 12E. This difference may correspond to $H_{plo}$=350 mV in FIG. 12D, suggesting that reproduction with a much larger amplitude than the amplitude obtained in FIGS. 12A and 12E is possible. Thus, higher power Pr2 was set at Pr2=2.1 mW, and lower power Pr1 at Pr1=1.9 mW in the following reproduction experiments using reproducing light pulses:

[Reproduction of Magneto-Optical Recording Medium with Power-Modulated Pulsed Light]

The magneto-optical recording medium 70 produced in the instant embodiment was initialized. Then, a track situated at a radius of 40 mm was subjected to optical modulation recording at a linear velocity of 5.0 m/s using laser light having a recording power of 6.3 mW and modulated to a period of 320 ns and a pulse width of 53.3 ns while applying a recording magnetic field of 500 Oe. This method corresponds to continuously recording about 1.6 μm record marks with a pitch of 3.2 μm.

Figure 16:
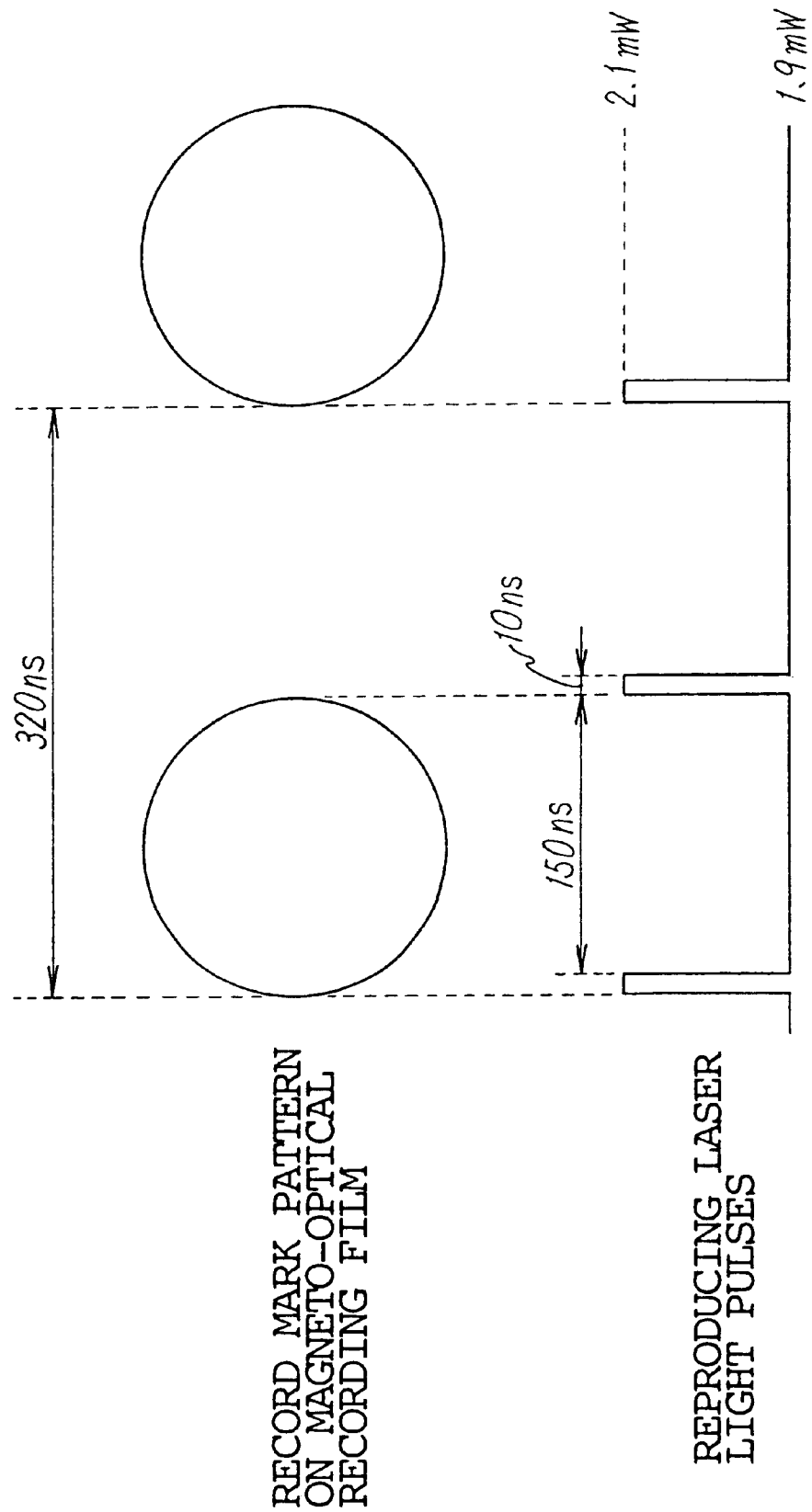
FIG. 16 is a view showing the timing of projecting, with respect to record marks, reproducing pulse light modulated to reproducing powers Pr1 and Pr2 determined by preliminary experiments in Embodiment 2.

The recorded track of the so recorded magneto-optical recording medium 70 was reproduced by irradiation with a pulsed laser power-modulated to reproducing light laser powers Pr2=2.1 mW and Pr1=1.9 mW that were decided on by the aforementioned preliminary experiments. The reproducing laser pulses were adjusted so that Pr2=2.1 mW would be applied with a pulse width of 10 ns from the front end of the record mark, followed by Pr1=1.9 mW with a pulse width of 150 ns, as shown in FIG. 16. During reproduction, no magnetic field was applied, but a leakage magnetic field (about 80 Oe) from an actuator of an optical head occurred in the recording direction.

Figure 17:
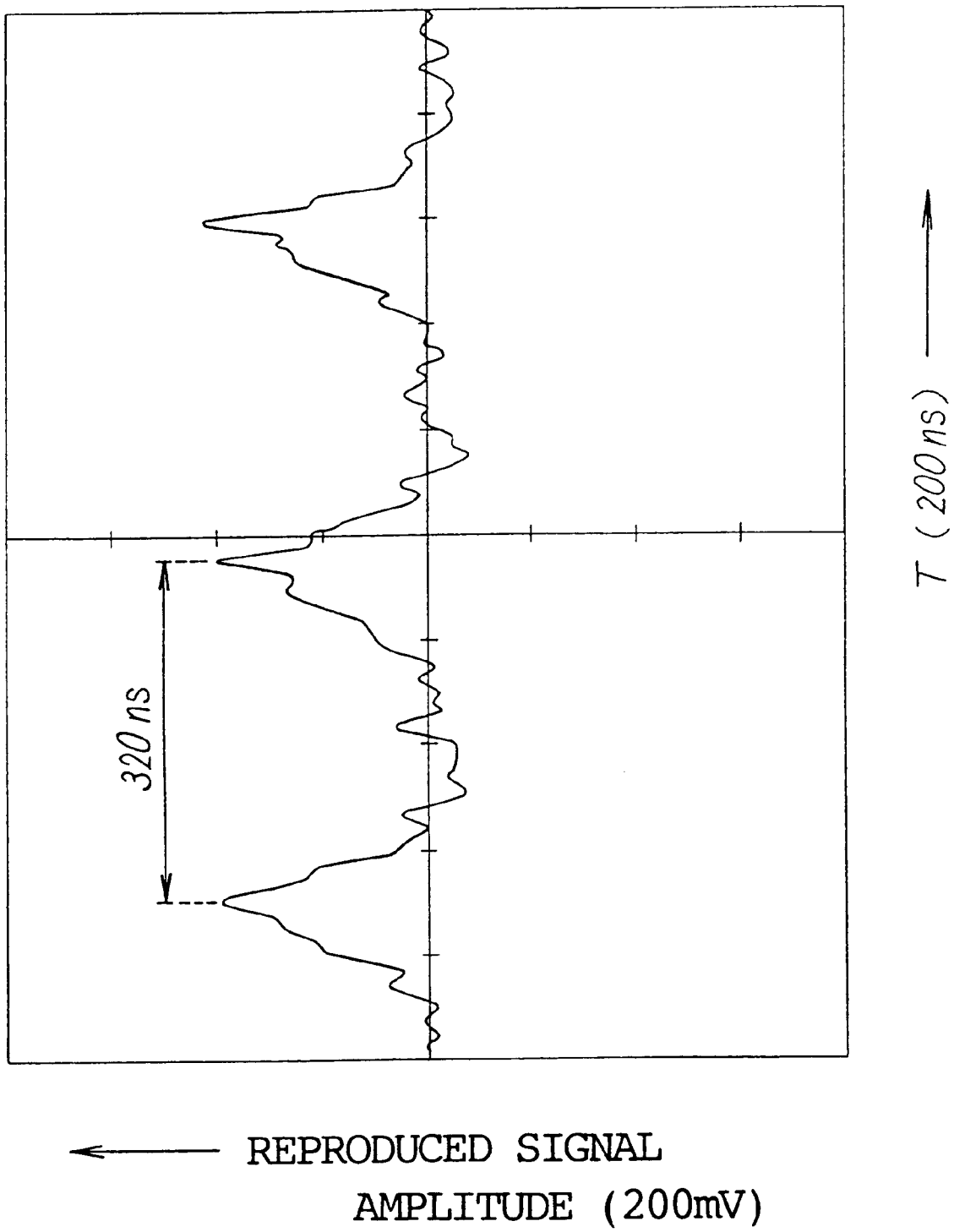
FIG. 17 is a graph showing a reproduced signal waveform obtained by reproduction using the reproducing pulsed light shown in FIG. 16.

The resulting reproduced signal waveform is shown in FIG. 17. Reproduced signals with an amplitude of about 220 mV were obtained in correspondence with the record marks. A mark pattern recorded under the same conditions was reproduced with continuous light with a constant reproducing power Pr=1.0 mW or Pr=2.1 mW. The amplitudes obtained were 100 mW and 170 mW, respectively. These results demonstrate that when reproduction is performed with reproducing light power-modulated in a pulsed manner, a recorded magnetic domain can be transferred in an enlarged form in synchronism with a reproduction clock and destroyed immediately thereafter, and reproduction can be performed at a higher C/N ratio as a result of enlargement.

According to the instant embodiment, the pulsed laser intensities, higher power Pr2=2.1 mW and lower power Pr1=1.9 mw, were selected, and the lower power pulses were used for enlarged magnetic domain generation, while the higher power pulses were used for enlarged magnetic domain elimination. However, it is possible to make the higher power pulses Pr2=1.9 mW for enlarged magnetic domain generation, and make the lower power pulses Pr1=1.0 mW for enlarged magnetic domain elimination. The example shown in FIG. 11 that was used in explaining the principle of the present invention corresponds to the latter case. The ratio between the pulse widths of the higher power pulses and the lower power pulses, namely, the duty factor, is not restricted to the example illustrated in FIG. 11 or 16, and may be varied, if desired, in order to obtain strengthened reproduced signals.

In the magneto-optical recording medium produced in Embodiment 2 as well, a thermal control film with a suitable heat conductivity may be provided on the protective film of the magneto-optical recording medium in order to impart a desired shape to the temperature profile of the medium when irradiated with a reproducing light beam, or to decrease the linear velocity dependence of the temperature profile. To obtain an even better reproduction C/N ratio, a reproducing magnetic film whose Kerr rotation angle θk at the peak temperature of the medium when irradiated with reproducing light is not less than the θk of the auxiliary magnetic film and which is a perpendicular-magnetized film at room temperature or higher may be additionally provided between the dielectric film 3 and the auxiliary magnetic film 8.

Recording was performed in Embodiment 1 by the use of a magneto-optical modulation system which modulates the polarity of an applied magnetic field in response to recording signals while projecting pulsed light, or in Embodiment 2 by the use of an optical modulation system which modulates optical intensity in response to recording signals while applying a DC magnetic field. However, there may be employed any of a magnetic modulation recording system using ordinary DC light, an optical modulation recording system, or a magneto-optical modulation system.

Industrial Applicability

The magneto-optical recording medium of the present invention comprises a magneto-optical recording film which is a perpendicular-magnetized film at room temperature or above, and at least one auxiliary magnetic film which is a plane-magnetized film in a temperature range from room temperature to a certain critical temperature ($T_{CR}$) and becomes a perpendicular-magnetized film at a temperature higher than $T_{CR}$, with the magnetic characteristics of these magnetic films being adjusted to be in a predetermined relationship. Thus, a recorded magnetic domain can be reproduced in an enlarged form, and the intensity of reproduced signals can be increased to obtain a satisfactory C/N ratio. The method of the present invention realizes super-resolution reproduction which causes little or no decrease in quantity of light contributing to a reproduction output by a magnetic mask, in comparison with a magneto-optical recording medium of a magnetic super-resolution type having an ordinary masking function. The use of the magneto-optical recording medium, and the reproducing method therefor, according to the present invention, makes it possible to reproduce, independently, much smaller record marks than the diameter of a reproducing light spot. Thus, the recording density of the magneto-optical recording medium can be increased markedly.

What is claimed is:

1. A magneto-optical recording medium comprising:
   a magneto-optical recording film which is a perpendicular-magnetized film at a temperature not lower than room temperature; and
   an auxiliary magnetic film which transforms from a plane-magnetized film into a perpendicular-magnetized film when exceeding a critical temperature;
   wherein a reproduction signal is reproduced by magnetically transferring a recorded magnetic domain of the magneto-optical recording film to the auxiliary magnetic film upon irradiation with reproducing light, and a reproduction signal with respect to time shows asymmetrical waveform with respect to a reproduction signal peak when the recorded magnetic domain of the magneto-optical recording film is reproduced by the reproducing light with a predetermined light power.

2. The magneto-optical recording medium according to claim 1, wherein the reproduction signal with respect to time shows symmetrical waveform with respect to the reproduction signal peak when the recorded magnetic domain of the magneto-optical recording file is reproduced by the reproducing light with a first light power region which is different from a second light power region including the predetermined light power.

3. The magneto-optical recording medium according to claim 2, wherein the first light power region has lower light power than the second light power region.

* * * * *